April 25, 1967  I. BONTEMPI  3,315,620
ALIMENTARY PASTE PRODUCTS CAN FILLING MACHINE AND METHOD
Original Filed Sept. 15, 1961  4 Sheets-Sheet 3

INVENTOR.
IGNATIUS BONTEMPI
BY
Darby & Darby
ATTORNEYS

April 25, 1967     I. BONTEMPI     3,315,620
ALIMENTARY PASTE PRODUCTS CAN FILLING MACHINE AND METHOD
Original Filed Sept. 15, 1961     4 Sheets-Sheet 4

INVENTOR.
IGNATIUS BONTEMPI
BY Darby & Darby
ATTORNEYS

United States Patent Office 3,315,620
Patented Apr. 25, 1967

3,315,620
ALIMENTARY PASTE PRODUCTS CAN
FILLING MACHINE AND METHOD
Ignatius Bontempi, Douglaston, N.Y., assignor to De Francisci Machine Corporation, Brooklyn, N.Y., a corporation of New York
Filed Sept. 2, 1965, Ser. No. 484,695
29 Claims. (Cl. 107—69)

This is a continuation-in-part of application Ser. No. 382,427, filed June 2, 1964, which is a division of application Ser. No. 138,432, filed Sept. 15, 1961 and issued as Patent No. 3,149,713, on Sept. 22, 1964.

This invention relates to paste products can filling machines and more particularly to an apparatus for automatically forming, cutting and placing measured amounts of paste products such as spaghetti, noodles and macaroni into cans.

My invention is useful primarily in canning spaghetti. Empty cans which have been given an initial charge of tomato sauce proceed to a machine of the type herein claimed, where they receive a measured amount of uncooked spaghetti. These cans then proceed to another sauce dispensing station to receive a charge on top of the spaghetti. The filled cans are then sealed and cooked under pressure.

The machine here disclosed employs conventional paste mixing and extrusion equipment to form depending strands of spaghetti. The strands extrude or "grow" downwardly from the extrusion die plate. The leading ends are trimmed evenly to make the strands uniform in length. Trimmings are collected and returned to the mixer for rerunning through the machine. After the spaghetti has been evenly trimmed, it is guided to a position over the empty cans and then cut off at the die plate to fall directly into them.

Among the new and useful features of my machine is the use of a rotary trim knife which is vertically adjustable relative to the die plate. This adjustability permits minute compensations for die wear and thereby accurate control of the can fill weight. It also makes possible a range of fill weights without changing the die plate configuration. The trimmer's rotary motion adds another advantage in that it permits continuous extrusion, trimming and recycling of the trim regardless of interruptions in other parts of the machine such as in the cutter or can conveyor mechanisms. The main advantage of this continuous trimming and extrusion lies in the fact that the extrusion press and trim return system need not be shut down for minor breakdowns elsewhere in the machine. This avoids the time loss and high power demand attendant with the restarting of the extrusion press and running it sufficiently long to achieve a smooth steady extrusion rate.

Another novel feature is the control arrangement employed in the machine herein disclosed. Dual limiting factors are combined to monitor the operation of the machine. The first controller is a timer which keeps the spaghetti strands from being cut off at the die until sufficient time has elapsed for the strands to be full grown, that is, for all of the strands to be evenly trimmed by the trimmer mechanism. The second controller is a can counter that keeps the cutter mechanism from operating unless a full bank of empty cans is in position to receive the cut-off spaghetti. Both of these limitations, full strand length and sufficient number of empty cans, must be met before the control system will actuate the cutter mechanism to cut off the spaghetti.

A third important feature of my invention is a can positioning mechanism which operates to handle a wide range of can sizes. The feature along with the vertically adjustable trimming mechanism makes possible the use of a single can filling machine for runs of different can sizes. Included in this can positioning mechanism are means to prevent jamming of the cans in the positioning operation. Such jamming is a prevalent problem in mechanisms of this type due to irregularities in can dimensions and to tipping and off-center loading of the cans on the conveyor device.

In a second embodiment of my invention the basic apparatus is modified to include a retractable stop above the cans which momentarily halts the fall of the cut spaghetti into the cans. I have found that under certain circumstances the direct fall of the spaghetti into the cans causes some of the cut strands to spill out of the can or droop over the upper rim of the can. This presents problems of sanitation and economy in that frequently these errant strands cause contamination of the machinery and mechanical problems. The problem is most aggravated when cut spaghetti is loaded into very small cans, such as the type used in automatic vending machines for holding a single portion of cooked spaghetti. By momentarily halting the fall of the cut spaghetti prior to its deposit in the can the spaghetti is allowed to settle into a more compact charge which more readily falls cleanly into the can. The problem of strands spilling out of the can or drooping over the rim is virtually eliminated by use of this retractable stop.

It is therefore, the principal object of this invention to provide an inexpensive and efficient machine for continuously and automatically filling containers with measured amounts of alimentary paste products.

It is another object of my invention to provide in a machine of the above described type a means for continuous and uniform trimming by a rotary trimmer mechanism with an associated means for recycling of the trimmings back through the machine.

It is a further object of my invention to provide in machines of the above type a means for easily compensating for die wear and for varying fill weights by employing a trimmer mechanism which is adjustable in height from the extrusion means located above it.

It is a still further object of my invention to provide in machines of the above type means for both varying fill weights and positioning cans of different sizes to receive the varying fill weights to permit use of a single machine for a range of can sizes.

It is a still further object of my invention to provide in machines of the above type a means for guiding the strands of alimentary paste products from the extrusion means first to the trimmer and then to the can filling position so as to permit continuous in line trimming of the depending alimentary paste products.

It is a still further object of my invention to provide in machines of the above type a control means which combines the dual limitations of accurate fill weight and availability of empty cans to receive the product in a manner which is reliable and yet permits fast automatic operation.

It is a still further object of my invention to provide an improved means and method for canning spaghetti by momentarily halting the flow of the cut spaghetti just prior to its deposit in the can to thereby reduce spillage and fouling of the cut spaghetti.

Other objects and a fuller understanding of my invention may be had by referring to the following description and claims, taken in conjunction with the accompanying drawings in which:

Figure 1:
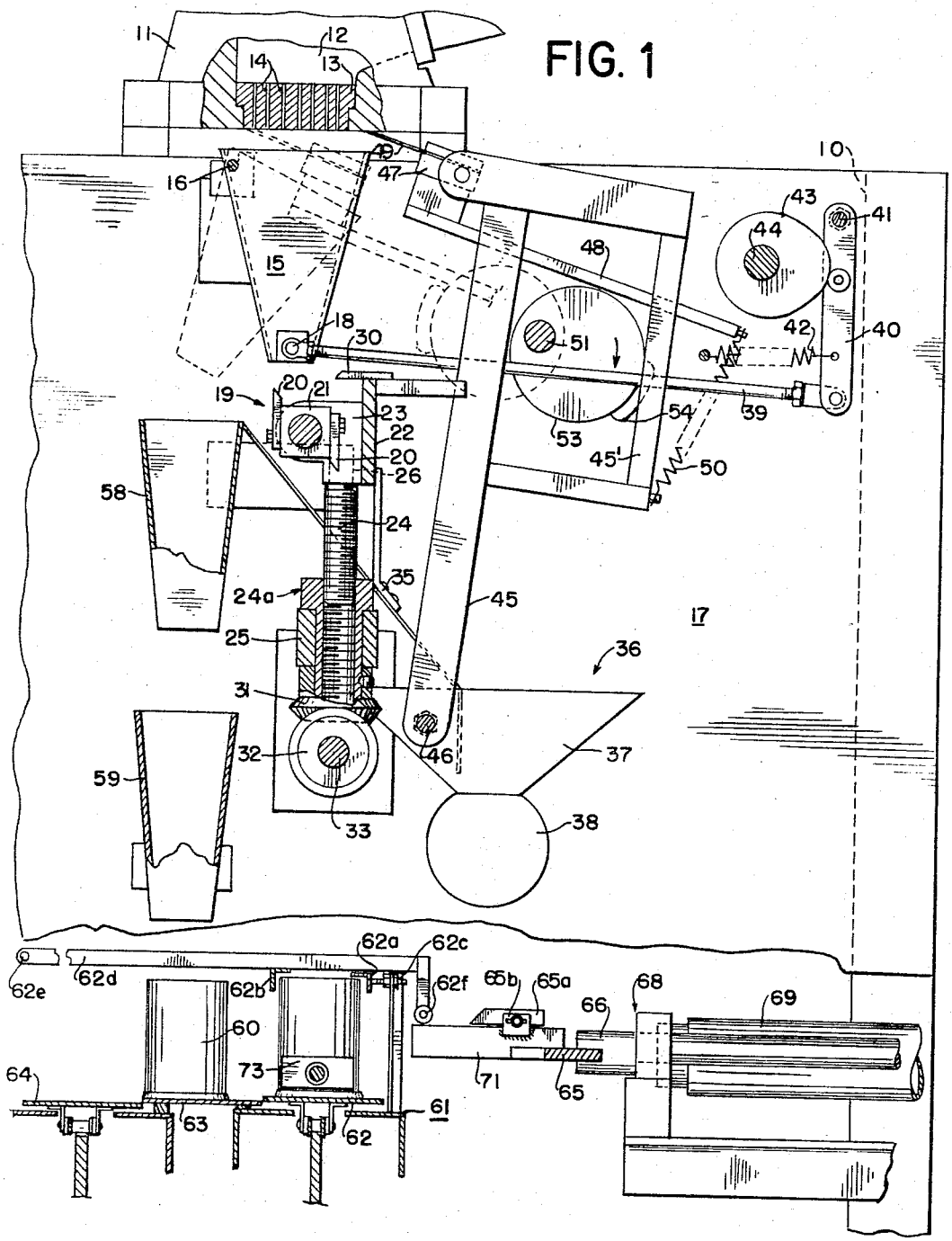
FIGURE 1 is a side elevational view in partial cross-section of a paste forming and can filling machine embodying features of this invention.
Figure 2:
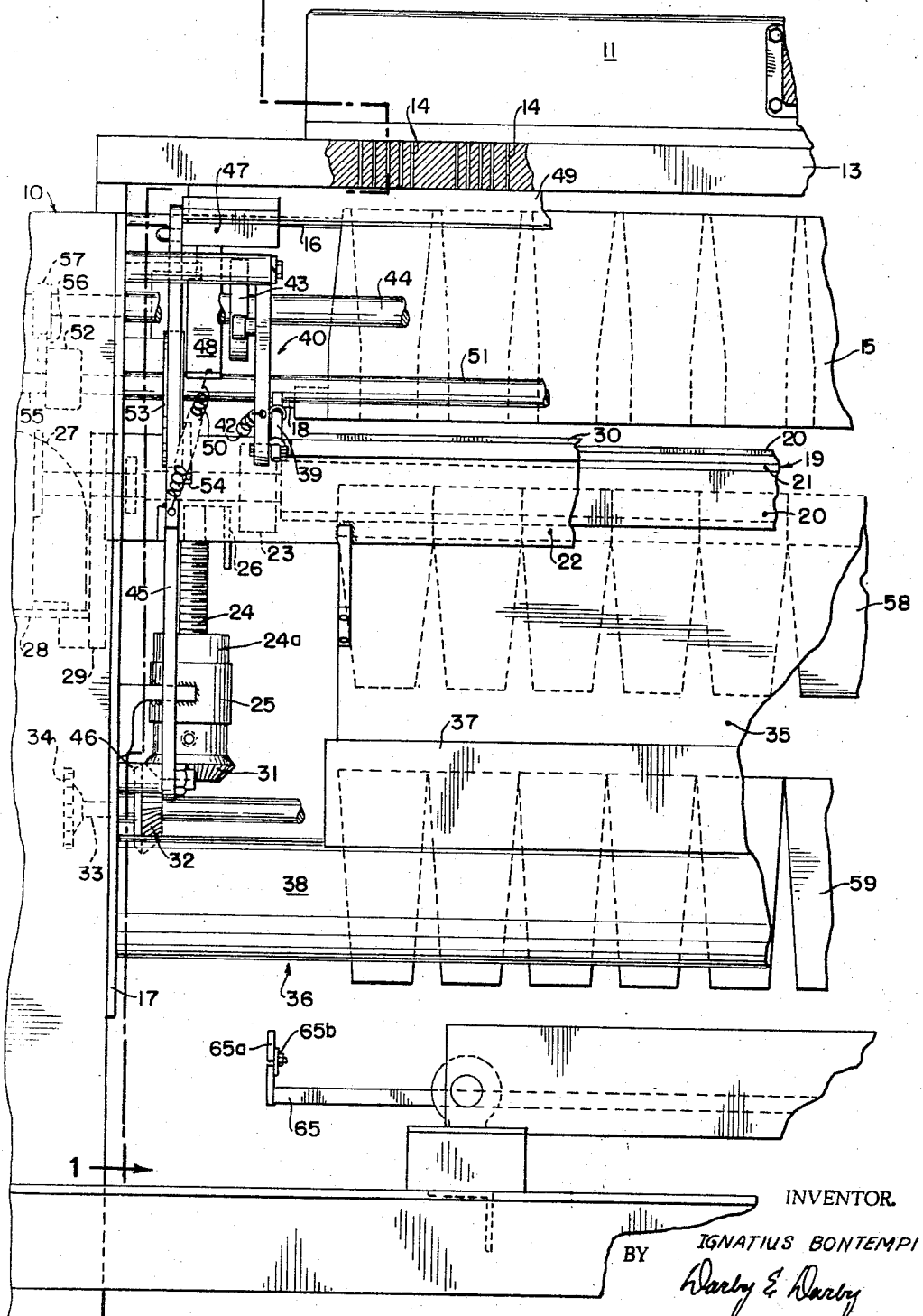
FIGURE 2 is a front elevational view in partial cross-section of the same, section line 1—1 indicating the plane on which FIGURE 1 was taken.

Referring to FIGURES 1 and 2 the reference character 10 indicates the framework by which the extrusion, head, strand guide, trimmer mechanism, cut-off knife and various actuating and conveying devices are supported.

Mounted atop the framework 10 is an extrusion head 11, into the interior chamber 12 of which is continuously delivered plastic alimentary paste under constant pressure. Supported in the bottom of the extrusion head is the longitudinally extending die plate 13.

The die plate 13 extends the length of the machine and is provided with laterally and parallelly spaced longitudinal rows of die apertures 14, said apertures being arranged in clusters with one cluster for each can to be filled. The number of clusters per die plate depends on the number of cans to be filled, which in turn is set by the can size and permissible spacing within the machine. The shape of the die aperture 14 determines the product to be canned, i.e., a round hole for spaghetti, a hole with a pin in it for macaroni or a flat slot for noodles.

The paste which has been forced into the extrusion head 11 continues to push through the die apertures 14, which for purposes of this description form it into depending strands of spaghetti. Below each cluster there is a funnel-shaped strand guide 15, sized at the top to accommodate all of the apertures 14 of an individual cluster. The strand guide 15 gathers the growing strands of spaghetti from the cluster and further segregates them from those of the adjacent clusters. The bank of strand guides 15 extends through the interior of the upper part of the framework 10 and is mounted by hanging from a pivot pin 16 which is journaled in suitable bearings mounted in the side walls 17 of the framework. This bank of strand guides 15 is positioned by the swing pins 18 extending from each side of the strand guides 15. The swing pins 18 are suitably journaled to linkages of the strand guide tilting mechanisms attached to each of the side walls 17, said tilting mechanism being describtd in detail hereafter.

Directly below the die plate 13 and the bank of strand guides 15 is the trimmer mechanism 19. As the spaghetti extrudes it grows unevenly, some strands being longer and others shorter. This uneven growth results from irregular die wear and inconsistencies in the composition of the paste. The trimmer mechanism 19 trims the leading ends of the growing spaghetti strands evenly to the same length.

Trimming is necessary to accurately fill the cans with predetermined amounts of spaghetti. The fill weight of the spaghetti charge is set by the cumulative cross-sectional area of the die apertures in each cluster 14 and the length of the spaghetti strands. This length is the distance between the die plate 13 and the trimmer mechanism 19, and it is accurately controlled by the uniform trimming of the depending strands of spaghetti. To accomplish this, all of the strands must be permitted to grow until the shortest one reaches the trimmer 19.

The main element of the trimmer mechanism 19 is a pair of rotary blades 20 extending the length of the die plate 13 and directly below and in line with it and the strand guides 15. The rotary blades 20 are fixed to the trimmer knife shaft 21, the center and major portion of which is square in cross section to accommodate the rotary baldes 20. The end portions of said trimmer knife shaft 21 are circular to permit journaling into suitable bearing supports hereinafter described.

The trimmer knife shaft 21 is mounted on a trimmer angle plate 22 by journaling the circular portions of the shaft 21 through two bearing support brackets 23 attached to the angle plate. The trimmer angle plate 22 is supported by two threaded lifter screws 24 adjacent to the interior face of each of the side walls 17 of the framework 10. Each lifter screw 24 is supported by an internally threaded collar 24a mounted and rotatable in the bearing bracket 25 fixed to the adjacent side wall 17. The upper ends of lifter screws 24 are fixed in the two bosses 26 on the trimmer angle plate 22. The purpose of this threaded mounting arrangement will be discussed later in this description.

The trimmer knife shaft 21 may be rotated by any conventional source of power, but preferably by an electric motor 27 which is mounted on a motor base plate 28 which in turn is attached adjacent the exterior face of the side wall 17 to the projecting end of the trimmer angle plate 22. Speed of rotation of the trimmer knife shaft may be reduced through suitable reduction gearing to that desired for the particular product. Additional shaft support may be obtained by journalling said shaft through suitable bearings in a shaft support plate 29 also mounted on the projecting end of the trimmer angle plate 22.

Cooperating with the movable blades 19 in the trimming operation is an opposed stationary blade 30 which also extends the length of the die 13. The stationary blade 30 is fixed to the trimmer angle plate 22 in a position relative to the movable blades 20 so as to cause a scissor-like trimming action between them.

The principal elements of the trimmer mechanism comprising the movable blades 20, power input motor 27 and stationary blade 30, are mounted on the trimmer angle plate 22 which rests on two threaded lifter screws 24. Keyed to the bottom of each of the threaded collars 24a which support the lifter screws 24 is a bevel gear 31 which meshes with a bevel gear 32 attached to an adjusting shaft 33 that passes through the adjacent side wall 17 through suitable bearings. Attached to the projecting end of shaft 33 is an adjusting hand wheel 34 which can be turned to raise or lower the trimmer mechanism 19 and thereby vary the fill-weight of the spaghetti charge or compensate for die wear as discussed above. The bevel gears 31 on each side of the framework 10 can be connected by suitable shafting to permit adjustment of both lifter screws 24 by turning a single hand wheel 34.

Trimmings cut by the trimmer assembly may be automatically fed back to the paste mixer for rerunning through the machine. This trim return system may take several forms. One found to be suitable comprises two main elements, a trim chute 35 which guides the trimmings into a pneumatic trim collector 36. Trim chute 35 is a flat sheet attached to the trimemr angle plate 22 extending the length of the die plate 13 and of sufficient width so that when positioned directly under the trimmer mechanism it gathers the falling trim and guides it to the trim collector trough 37. The trim collector trough 37 then feeds the trim to the pneumatic transfer tube 38 through suction slits in its upper portion which then conveys the trim back to the paste mixing and extruding press.

After the spaghetti has been trimmed it is ready to be cut and dropped into the empty cans. The in line trimming arrangement precludes in line cutting so the spaghetti is tilted off the die-trimmer axis to the can filling position just prior to being cut off. As will now be described, the strand guides 15 accomplish this tilting function.

As pointed out above, a bank of strand guides 15 extending the length of the die plate 13 and accommodating each of the aperture clusters 14 hangs from the pivot pins 16 and is positioned at its lower end by the swing pins 18. The swing pins 18 are pivotally attached adjacent the interior face of each side wall 17 to a pair of tilting levers 40 through linkages 39. Each of said tilting levers 40 is pivotally connected to a fulcruming support 41 which projects from the inner face of the adjacent side wall 17. Connected between each tilting lever 40 and the side wall 17 is a pull string 42 which pulls the tilting lever 40 against the lobe of the strand guide cam 43 mounted on the strand guide cam shaft 44 which is journaled through the adjacent side wall 17. The strand guide cam shaft 44 may be driven by any conventional power source, preferably an electric motor, and is intermittently actuated according to a control arrangement which will be detailed later herein.

When the strand guide cam shaft 44 is rotated, the eccentricity of the cam lobes 43 permits the spring tensioned tilting levers 40 to move toward the strand guides 15, causing the linkages 39 to push against the swing pins 18 and thereby tilt the bank of strand guides 15 about the pivot pins 16. The cam lobe faces 43 are adapted to permit the lower end of the strand guide 15 to swing directly over the can filling stations as will be described hereafter.

With the bank of strand guides 15 in this tilted can filling position (shown in broken lines in FIG. 1), the spaghetti may be cut off at the die plate 13 and dropped into the empty cans. This cutting operation is essentially the same as that disclosed in the De Francisci Patent 2,687,101, presently held by the assignee of this application.

The cutting means comprises cutter blade operating arms 45, the lower ends of which are pivotally connected to fulcruming supports 46 which project from the inner faces of the side walls 17 of the framework. The upper portions of the arms 45 are provided with rectangular slot type cam followers 45' which are respectively disposed below and adjacent to the respective ends of the extrusion head 11. Pivotally connected with the upper end of each arm 45 is an oscillatable bracket block 47 which is provided with a rearwardly extending tailpiece 48. A forwardly projecting cutter blade 49 is affixed by its ends to and for extension between the bracket blocks 47. Connected between the tail piece 48 and cam followers 45' are diagonally and downwardly extending pull springs 50 which yieldably exert down tilting pull on the tail pieces 48 to up-tilt the cutter blade 49 to operatively engage its free cutting edge with the external or bottom face of the die plate 13.

This cutting mechanism is actuated in essentially the same way as also described in the above De Francisci patent. The mechanism comprises a cutter cam shaft 51 that extends through the upper part of the framework 10 and which is journaled in suitable bearings mounted in connection with the side walls 17. Said shaft 51 is disposed so as to cross adjacent to and outwardly of the operating arms 45 of the cutting means served thereby. The shaft 51 is driven by a one revolution clutch device 52 preferably of the type detailed in the above patent. The driven member of the clutch is freely rotatable on the outer end portion of the shaft 51. Fixed on the shaft 51 are respective cam members by which the operating arms 45 of the cutting means to be operated thereby are actuated. These cam members are each formed to provide a cam lobe 53 adapted to operatively engage the cam follower 45' of each operating arm 45, and an inwardly off-set trailing cam lobe 54 adapted to operatively engage the tail piece 48 of the oscillatable bracket block 47 which is carried by said operating arm 45.

The power supply for the driver member of the clutch 52 is the drive shaft 55 journaled through suitable bearings in the adjacent side wall 17 which continually rotates while the machine is in operation. Power may be supplied to the shaft 55 by any conventional source, preferably an electric motor.

The one revolution clutch 52 is controlled by the actuating lever arm 56 projecting from said clutch which times the operation thereof in properly synchronized relation to the operation of the strand guide tilting mechanism. The related member fixed on the strand guide cam shaft 44 directly in line with the clutch actuating lever arm 56 is the clutch tripping lever 57 which is sized to bear against and trip said actuating lever 56.

When the one revolution clutch 52 is inactive, and the cutter cam shaft 51 actuated thereby is stopped, the cam lobes 53 are so positioned with respect to the cutter blade operating arms 45 that the latter occupy outswung positions whereby the cutter blade 49 is retracted to its normal initial position, in which position said cutter blade is uptilted to operatively engage its cutting edge with the bottom face of die plate 13. As the bank of strand guides 15 is tilted to the can filling axis by rotation of the strand guide cam shaft 44, the clutch tripping lever 57 affixed to said shaft trips the clutch actuating lever 56 and thereby couples the drive shaft 55 with the cutter cam shaft 51. The single revolution of the shaft 51 rotates the cam lobes 53 against the cutter blade operating levers 45, whereby to swing the latter inwardly and thus cause the cutter blade 49 to traverse the die apertures 14 of die plate 13, so as to cut away the paste strings issued therefrom (shown in broken lines in FIG. 1). By the time the cam lobes 53 complete their thrust against the operating arms 45 by which the cutting stroke of the cutter blade 49 is induced, and begin to move away therefrom, the trailing cam lobes 54 have approached and engaged the tailpiece 48 of the cutter blade bracket blocks 47, whereby to upswing said tailpieces and thus downswing the cutter blade 49 away from the die plate 13, while the cutter blade is being retracted to normal initial position by engagement of cam lobes 53 with cam followers 45'.

On being cut the spaghetti is directed to the cans below in the following manner. Directly below each of the strand guides 15 in their tilted can filling position is an upper telescoping strand chute 58, a lower telescoping strand chute 59 and an empty can 60 resting on the can positioning mechanism 61 at the base of the framework. Said upper telescoping strand chute 58 is one of a bank extending the length of the die plate 13, sized and positioned to accommodate each of the strand guides in their tilted can filling position. This upper bank of strand chutes 58 is mounted on the trimmer angle plate 22 to move as a unit with said angle plate 22 thereby adjusting in height with the trimmer 19 to handle the various lengths of spaghetti brought about by the adjustment of the height of said trimmer.

The lower telescoping bank of strand chute 59 is sized and positioned to telescope around the outside of the lower end of the upper strand chutes 58. The lower bank of chutes 59 is mounted on a plate extending through the lower part of the framework 10 and attached to the side walls 17, in a position directly above the cans 60 resting on the can conveyor mechanism 61 at the base of the framework 10.

When the trimmed spaghetti is cut away from the die plate 13 by the cutter mechanism described above, it passes through the tilted strand guide 15 and is successively guided by the upper chute 58 and lower chute 59 to the can 60. To facilitate passage of the damp spaghetti paste through the tilted strand guide 15, the guide may be heated by any of several means such as direct hot air draft or electrical resistance heating.

Figure 3:
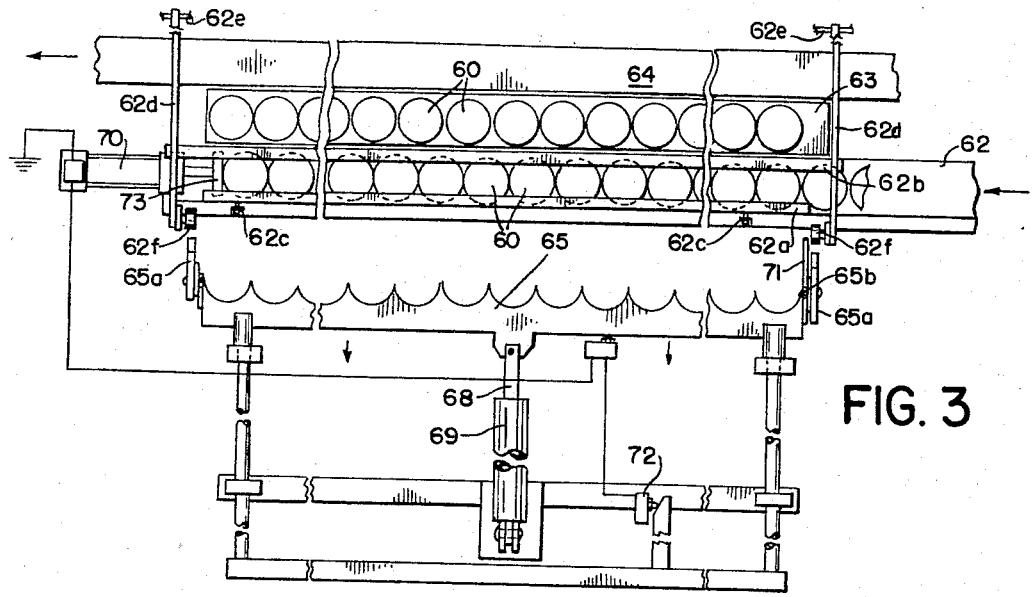
FIGURE 3 is a plan view of a can conveyor mechanism embodying features of this invention.

Referring to FIGURES 1 and 3, the can positioning mechanism 61 comprises essentially four parts, an inlet conveyor 62, a dead plate 63, an outlet conveyor 64 and a push bar 65 with associated power guiding and actuating equipment. The dead plate 63 extends the length of the die and is fixed to the base of the framework 10 in a position directly in line with the telescoping strand chutes 58 and 59 and the bottom of the strand guides 15 in their tilted can filling position. The dead plate 63 is the plate on which hte cans 60 rest to receive the spaghetti charge from the tilted strand guide 15. Directly adjacent and slightly above the dead plate 63 is the inlet conveyor 62 which supplies cans from an external source to the can filling station. Said inlet conveyor 62 may be any of the conventional belt conveyors, preferably of the segmented link type. Directly adjacent and on the opposite side of the dead plate 63 and slightly lower is the outlet conveyor 64, also one of a conventional type referred to above, which carries the filled cans away from the filling station. The push bar mechanism 66 comprises a push bar 65 shaped as a series of semi-circles of diameters slightly larger than that of the cans for improved centering fixed to a retractable plunger 68 which is actuated by a conventional power source, preferably an air cylinder 69.

With the push bar 65 in its normally retracted position, the inlet conveyor 62 brings in empty cans 60 until the lead can reaches the stop mechanism 70. Two guide rails, outer rail 62a and inner rail 62b, are provided to center the incoming cans on the inlet conveyor 62 and to keep them aligned in a horizontal and vertical plane when stopped by the can stop mechanism 70. Outer rail 62a extends the length of the machine, and is fixed at each end to the base of the framework 10 through adjusting screws 62c which permit changing the distance between the rails for handling different can sizes. Inner rail 62b extending the same length is movably mounted by lifter arms 62d which are pivoted to fulcruming supports 62e which project from the inner faces of each of the side walls 17. Also attached to each of the lifter arms 62d is a cam roller follower 62f, the operation of which will next be pointed out.

Extension of the push bar 65 pushes the cans 60 from the inlet conveyor 62 down and onto the dead plate 63. However, before this is done, the pivoted inner rail 62b must be lifted away from the cans. This is accomplished by a plate cam 65a attached to each end of the push bar 65 and positioned to engage the roller follower 62f. As the push bar 65 extends, the plate cam 65a engages the roller follower 62f which lifts the pivoted inner rail 62b, whereupon the continued extension pushes the cans onto the dead plate 63. The push bar 65 automatically retracts to its original position. The cans on the dead plate 63 then receive their spaghetti charge. In the meantime, another batch of empty cans has been brought to the filling station by the inlet conveyor 62. The push bar 65 is then again actuated and the new group of empty cans is pushed onto the dead plate 63, thereby displacing the cans which have already been filled and pushing them onto the outlet conveyor 64 which carries them away for further processing not connected with this machine.

The position of plate cam 65a is made adjustable relative to the push bar 65 by means of a slot and bolt mounting 65b. This adjusting means permits more accurate timing of the lifting of the pivoted guide rail 62b and also permits changing the position of plate cam 65a for different can sizes. This adaptability to different can sizes when coupled with the variable fill weight capabilities of this machine, marks a significant advance in that it enables a single machine to form, cut and fill for a range of can sizes with only minor adjustments being made to the machine.

An anti-jamming mechanism has been incorporated in this can positioning system, which works with the guide rails 62a and 62b to prevent jamming caused by overcrowding and canting of the empty cans on the inlet conveyor 62 and by the engagement of pusher 65 with cans off-center thereby resulting in a stoppage of the conveyor system. Jamming of this type is frequently caused by irregularities in can dimension or by cans not resting squarely on their inlet conveyor 62. This anti-jamming mechanism comprises a divider plate 71 attached to that end of push bar 65 which is on the incoming side of the inlet conveyor 62, a relay switch 72 which is actuated by the initial movement of the push bar 65 and a retractable stop, preferably a retractable piston 73 actuated by the relay switch. Said relay switch 72 may be any of a conventional type with a tripping mechanism triggered by the movement of the push bar 65, which relay switch then actuates a conventional power cylinder for extending or retracting the retractable piston 73. In operation the incoming cans on the inlet conveyor 62 are stopped by the retractable piston 73 in its extended position. When the push bar is actuated to push the cans on to the dead plate 63 the divider 71 separates the last can in the batch of cans in the filling station from the next following can, thereby preventing this can and any following cans from pushing against the can already in the filling station. Immediately after this separation the trip mechanism of the relay switch 72 is triggered to retract the piston 73 permitting the cans in the filling station to be freely centered in the individual arcs of the push bar 65. The push bar 65 continues its extending motion to push the empty cans on to the dead plate 63, accurately centering them for the filling operation. On its return stroke the push bar 65 retrips the relay switch 72 which actuates the retractable piston 73 to return to its original extended position ready for the next batch of empty cans which will start to enter the loading position when the divider 71 retracts free of the lead can on the inlet conveyor 62.

The trimming, cutting and can filling operations are all actuated by separate mechanisms, but in alternate timed relation one to the other. Also synchronized with these operations is the can conveyor system. These operations are coordinated by a series of conventional switches and controllers which can best be described by going through a complete cycle of operation of the machine. In this cycle two control limitations must be met. The cutter mechanism must not cut off the spaghetti strands until sufficient time has elasped to permit adaquate growth of the extruded strands to give even trimming by the trimmer mechanism. The depending stdands must also not be cut before a full bank of empty cans is in position ready to receive the spaghetti charge.

This control arragement in cooperating with the continuously running rotary trimmer is an important feature of my invention. If there is a failure in the can conveying system so that a full bank of empty cans is not in position ready to receive the spaghetti, this controller keeps the cutter from cutting off the spaghetti. While the failure is being corrected the extrusion continues, and the rotary trimmer continues to trim the leading ends of the spaghetti in conveniently small lengths for easy recycling back to the extruder. The extruder need not be shut down and restarted, avoiding the power consuming and time wasting step of running in the press to a steady extrusion rate.

Figure 4:
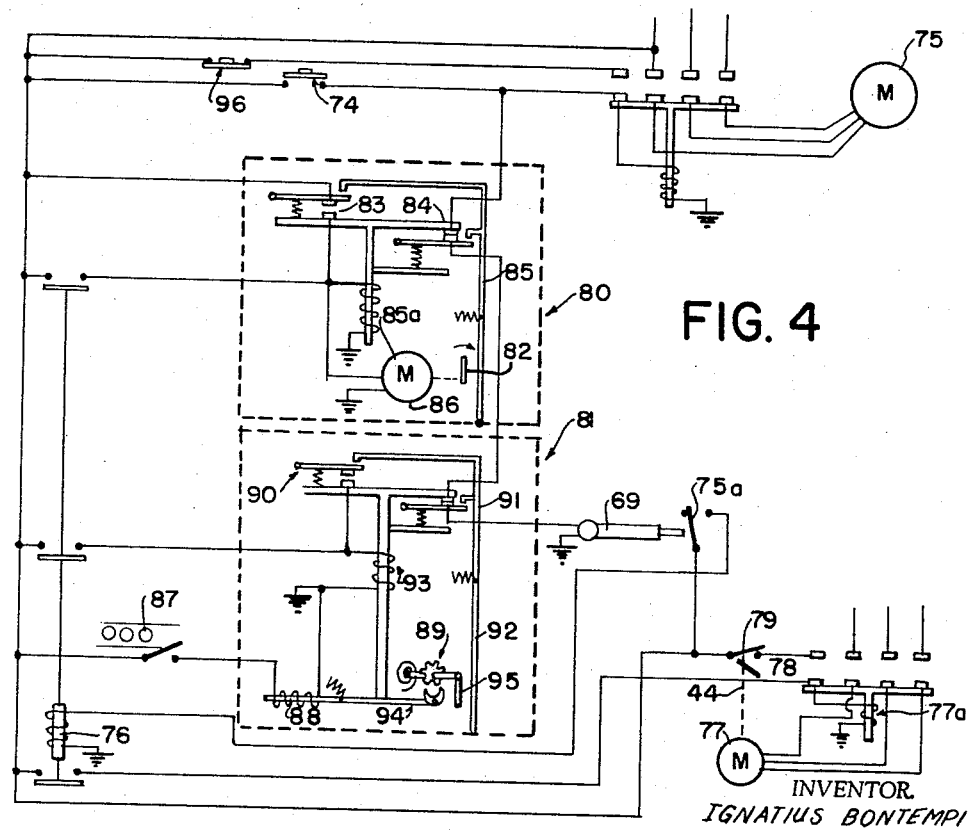
FIGURE 4 is an electrical schematic illustrating a control arrangement embodying features of this invention.

The extruder press can conveyor belts, trimmer motor and pneumatic trim return system are first started. These run continuously while the machine is being used. Referring to the electrical schematic in FIGURE 4, the first cycle is started by pressing a start button 74, after which the cycles follow automatically. When the spaghetti is full length, that is down to the trimmer knife, and the inlet conveyor is full with empty cans, the start button 74 can be pressed. This button actuates a conventional starter to start the cutter motor 75 which powers the cutter cam shaft. This start button 74 also energizes the push bar air cylinder 69 to extend the push bar and push a bank of empty cans onto the dead plate in position for filling. The air cylinder 69 is one of a conventional type which is actuated by an instantaneously applied voltage, extends full length and then retracts automatically In the forward part of its stroke the push bar 65 trips a micro-switch 75a which throws a relay 76 which in turn starts the strand guide motor 77 that rotates the strand guide cam shaft 44. Return of the push bar 65 returns the micro-switch 75a to its normally open position, returning relay switch 76 to its normally open position. Strand guide motor 77 remains energized by means of conventional starter switch 77a.

Rotation of the strand guide cam shaft 44 tilts the spaghetti away from the trimmer assembly to a position over the empty cans on the dead plate. As the strand guides reach the can filling position, the clutch tripping lever on the strand guide cam shaft releases the one revolution clutch actuating lever arm on the cutter cam shaft, coupling the drive shaft of the cutter motor 75 with the cutter cam shaft to thereby cut the strands at the die. The strands then fall through the tilted strand guides and telescoping chutes into the empty cans on the dead plate. The strand guide cam shaft 44 continues its rotation to tilt the strand guides to their forwardmost position and then return back to their original position where as shut-off pin 78, also affixed to said strand guide cam shaft, strikes a micro-switch 79 which breaks the starter circuit to stop the strand guide motor 77.

Following this initial manually started cycle, all recurring cycles are automatic. Each cycle is started by the extension of the push bar 65, putting empty cans in the filling position and tripping the micro-switch 75a.

As pointed out above, tripping the micro-switch 75a throws the relay 76 which starts the strand guide motor 77 rotating the strand guide cam shaft 44 which in turn actuates the cutting of the spaghetti and dropping of it into the cans. This relay 76 also starts the timer 80 and the can counter 81, which two devices combine to automatically control recurring cycles of the machine.

As discussed earlier, the two controlling limitations in the automatic operation of the machine are first, sufficient extruding time for the spaghetti to grow full length so as to be evenly trimmed by the trimmer and, second, enough empty cans in position ready to receive the spaghetti. The first limitation is met by the operation of the timer 80, and the second by the can counter 81.

The first actuation of the push bar air cylinder 69 is accomplished by pressing the start button 74. Subsequent actuations are automatically timed by interposing the timer 80 and the counter 81 in the circuit powering the air cylinder 69, so that both time and can supply limitations must be met before the circuit is closed to actuate said cylinder.

Since the timer 80 and the counter 81 are standard units, the construction of which forms no part of this invention, only the elements considered essential to the understanding of the control arrangement will be detailed.

A typical timer assembly suitable for use in this machine comprises essentially a tripping lever 82, a normally open switch 83, a normally closed switch 84, and a spring tensioned pivoted contact bar 85. The tripping lever 82 is powered by an electrically actuated power source 86, the timer for which can be adjusted according to the time required for the spaghetti to grow to full trimming length. The contact bar 85 is returned to its normal position by a torsion spring.

When the push bar 65 closes the micro-switch 75a to throw the relay 76, this closes the normally open switch 83 and opens the normally closed switch 84, thereby breaking the circuit to the air cylinder 69. This also starts the timer power source 86 to run. When the preset time has elapsed, the tripping lever 82 is actuated to bear against the contact bar 85 and turn it about its pivot. This motion of the pivot bar opens the switch 83 breaking its holding circuit and resetting the timer to its original position. This motion also closes the switch 84 thereby closing the circuit through the timer to the air cylinder 69. The circuit through the can counter 81, the operation of which will now be considered, must also be closed in order to actuate the air cylinder 69.

The can counter assembly 81 is also a conventional type, comprising a count micro-switch 87, count coil 88, ratchet lever assembly 89, normally open switch 90, normally closed switch 91 and spring retained pivoted contact bar 92. The count micro-switch 87 is positioned alongside the inlet conveyor and is intermittently closed by the passage of each can. Each closure of the switch 87 actuates the count coil 88 which progressively advances the ratchet lever assembly 89 in a manner hereinafter described.

When the relay 76 is closed, this closes the normally open switch 90 and opens the normally closed switch 91 thereby breaking the circuit to the push bar air cylinder 69. These switches are mounted on a common solenoid bar 93 which rises in the switching action above referred to, and such rise engages the ratchet lever assembly 89 in following manner.

The count coil 88 acts on a spring tensioned register bar 94, to move it transversely with each actuation from the count micro-switch 87. This transverse movement is converted by the ratchet lever assembly 89 to progressive turning of the tripping lever 95. When switches 90 and 91 are in their normal open and closed position respectively, the solenoid bar 93 bears down on the spring tensioned register bar 94 and thereby keeps it disengaged from the ratchet lever assembly 89. When the switch positions are reversed the solenoid bar 93 rises, engaging the register bar 94 to the ratchet lever assembly 89 so that impulses from the count micro-switch 87 progressively turn the tripping lever 95.

Thus with switch 90 closed and switch 91 open the tripping lever 95 advances with each can entering the inlet conveyor. When the full number of cans passes the micro-switch 87 the tripping lever 95 advances the last step to bear against the spring retained pivoted contact bar 92 causing it to open switch 90 and close switch 91, thereby closing the counter circuit to the push bar cylinder 69. The tripping lever 95 automatically returns to its original position by action of a torsion spring when the holding circuit through switch 90 is broken and solenoid bar 93 drops and bears against register bar 94 to disengage the ratchet lever assembly 39.

After the first manually started cycle the strands continue to grow until they reach the full trimmed length at which time the timer 80 runs out. If the inlet conveyor is full, that is if the counter 81 has counted the number of cans necessary to fill it, the timer running out will initiate the next cycle by electrically shifting the valve on the push bar air cylinder 69 causing the push bar 65 to extend. If the inlet conveyor is not full, the cycle will wait for the last can to enter and the counter will cause the valve to shift and the push bar 65 to go forward. The empty cans going on the dead plate cause the displacement of the full ones onto the outlet conveyor whereupon they are carried away. When the push bar starts forward, it hits the micro-switch 75a which starts the timer counter and strand guide motor to automatically begin a new cycle, each cycle recurring automatically thereafter until the stop switch 96 is pressed.

Figure 5:
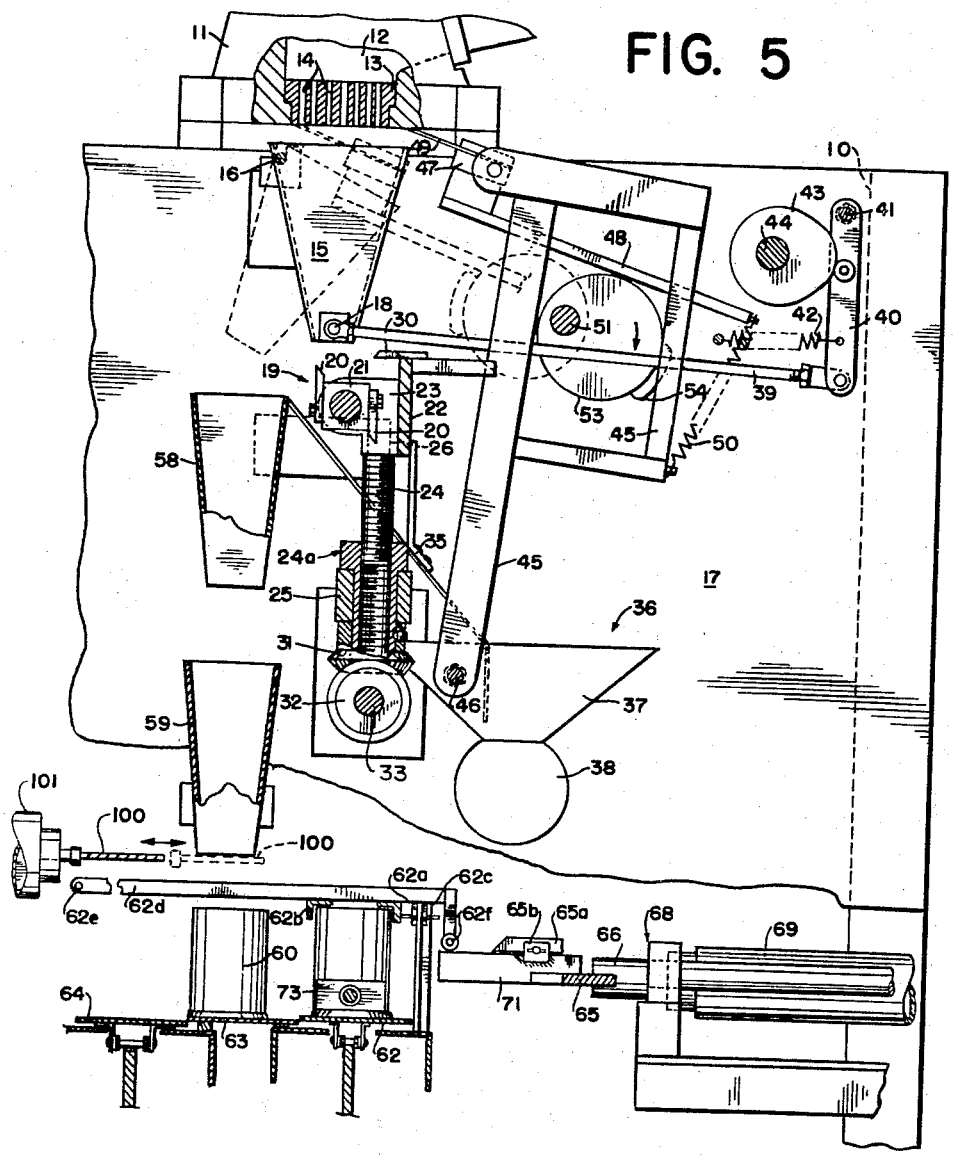
FIGURE 5 is a side elevation view similar to FIG. 1 but differing in that it includes a retractable stop for momentarily halting the fall of cut spaghetti into the can.

Referring to FIGURE 5, there is illustrated an embodiment of my apparatus which includes a retractable stop 100 for momentarily halting the fall of the cut spaghetti on its descent into the can 60. Stop 100 may be intermittently actuated by a conventional air cylinder 101 in synchronism with the actuation of cut-off knife 49 and strand guide 15 by conventional timing means essentially similar to those described above with reference to the timing of the latter two elements.

The sequence of actuation is to extend stop 100 beneath chute 59 when strand guide 15 commences its tilting motion to the left. The strands are then cut off by knife 49 and fall through chutes 58 and 59 where they come to momentary rest against stop 100. Stop 100 is then retracted and the strands permitted to fall into the can 60. The time of rest against stop 100 must be sufficient for the cut strands to settle into a relatively compact charge.

The foregoing description discusses only two embodiments, with certain variations of types of machines within the scope of my invention. Although particular variations have been pointed out, other modifications could be made within my inventive scope. For example, the actuating cam devices might be replaced with synchronized pneumatic or hydraulic cylinders or motors, but this would still be included within my invention. Therefore, the scope of the present invention is not to be construed as limited to the particular embodiment shown, but rather is to be defined solely by the appended claims.

What is claimed is:

1. Spaghetti forming, cutting and loading apparatus comprising in combination:
    (a) a spaghetti extruder to continuously extrude downwardly depending strands of spaghetti,
    (b) trimming means positioned below said extruder to trim the leading end of the spaghetti,
    (c) means for positioning a container below and laterally displaced from said trimming means to receive the spaghetti separately from trimmings cut by said trimming means,
    (d) movable strand guide means between said extruder and said trimming means to guide the leading ends of spaghetti first to said trimming means and then to said container,
    (e) a cut-off knife below said extruder and spaced above said trimming means to cut the spaghetti to the desired length.
    (f) means for moving said strand guide means to direct the spaghetti away from said trimming means and into said container upon being cut by said cutting means, and
    (g) means intermediate said strand guide means and said container for momentarily halting the downward fall of the cut spaghetti, the duration of said interruption being preselected to allow the cut strands to settle into a relatively compact charge.

2. The method of forming, cutting and loading spaghetti into a container comprising in combination the steps of:
    (a) continuously extruding spaghetti in downwardly depending strands,
    (b) repetitively trimming the leading ends of the strands to uniform length by cutting away small lengths of spaghetti,
    (c) positioning said container in a position for receiving the trimmed strands separately from the trimmings caused by said trimming,
    (d) guiding the trimmed strands away from the trimming position toward said container,
    (e) cutting the trimmed strands to the desired length when such strands upon being cut are positioned to fall into said container, and
    (f) momentarily halting the downward path of the cut strands for a period sufficient to allow such strands to settle into the relatively compact charge.

3. Spaghetti forming, cutting and loading apparatus as claimed in claim 1, wherein said means for momentarily halting the downward fall of said cut spaghetti comprises a retractable stop positioned intermediate said strand guide means and said container.

4. In an alimentary paste products forming and can filling apparatus including means for extruding paste downwardly through a die to form depending strands and further including cutting means cooperating with said die for cutting away said depending strands, the combination comprising trimming means spaced a predetermined distance below said die to trim the leading ends of said depending strands, means positioned below said die and laterally displaced from said trimming means for receiving said trimmed strands on being cut by said cutting means, strand-guiding means positioned below said die and above both said trimming means and said strand-receiving means and movably mounted for guiding said depending strands, and means for positioning said strand-guiding means to guide said depending strands first to said trimming means and then over said strand-receiving means whereby said strands are first trimmed, and then guided over said receiving means to fall into said receiving means upon being cut by said cutting means.

5. In an alimentary paste products forming and container filling apparatus including means for extruding paste downwardly through a die to form depending strands and further including cutting means cooperating with said die for cutting away said depending strands, the combination comprising rotary trim knife spaced a predetermined distance below said die, means to rotate said trim knife to trim the leading ends of said depending strands, means for supporting a container below said die and laterally displaced from said trim knife for receiving said trimmed strands on being cut by said cutting means, a strand guiding chute positioned below said die and above both said trim knife and said container and movably mounted for guiding said depending strands, and means for positioning said chute to guide said depending strands first to said trim knife and then over said container whereby said strands are first trimmed, and then guided over said container to fall into said container upon being cut by said cutting means.

6. In an alimentary paste products forming and container filling apparatus including means for extruding paste downwardly through a die to form depending strands and further including cutting means cooperating with said die for cutting away said depending strands, the combination comprising a rotary trim knife spaced a predetermined variable distance below said die, means to rotate said trim knife to trim the leading ends of said depending strands, means for adjusting the height of said trim knife relative to said die, means for supporting a container below said die and laterally displaced from said trim knife for receiving said trimmed strands on being cut by said cutting means, a strand-guiding chute positioned below said die and above both said trim knife and said container and movably mounted for guiding said depending strands, and means for positioning said chute to guide said depending strands first to said trim knife and then over said container whereby said strands are first trimmed to the desired length, and then guided over said container to fall freely into said container upon being cut by said cutting means.

7. In an alimentary paste products forming and container filling apparatus including means for extruding paste downwardly through a die to form depending strands and further including cutting means cooperating with said die for cutting away said depending strands, the combination comprising a rotary trim knife spaced a predetermined variable distance below said die, means to rotate said trim knife to trim the leading ends of said depending strands, means for adjusting the height of said trim knife relative to said die, means for supporting a container below said die and laterally displaced from said trim knife for receiving said trimmed strands on being cut by said cutting means, a strand guiding chute positioned below said die and above both said trim knife and said container and pivotally mounted relative to said die for guiding said depending strands, and means for swinging the lower end of said guide chute alternately to positions first above said trim knife and then over said container to guide said depending strands whereby said strands are first trimmed to the desired length and then cut by said cutting means to fall freely into said container.

8. In an alimentary paste products forming and container filling apparatus including means for extruding paste downwardly through a die to form depending strands and further including cutting means cooperating with said die for cutting away said depending strands, the combination comprising a rotary trim knife spaced a predetermined variable distance below said die, means to rotate said trim knife to trim the leading ends of said depending strands, means for adjusting the height of said trim knife relative to said die, means for supporting a container below said die and laterally displaced from said trim knife for receiving said trimmed strands on being cut by said cutting means, a strand guiding chute positioned below said die and above both said trim knife and said container and movably mounted for guiding said depending strands, means for positioning said chute to guide said depending strands first to said trim knife and then over said container whereby said strands are first trimmed to the desired length, and then guided over said container to fall freely into said container upon being cut by said cutting means, said means for supporting a container including container conveying means comprising a stationary dead plate for positioning containers to receive said cut strands, an inlet conveyor associated with said dead plate for supplying said containers directly adjacent to said dead plate, an outlet conveyor adjacent to said dead plate opposite said inlet conveyor for carrying said containers away from said dead plate on receiving said cut strands of alimentary paste and means for repetitively moving said containers from said inlet conveyor on to said dead plate so as to sequentially position said containers on said dead plate and then push and advance said containers on to said outlet conveyor.

9. In an alimentary paste products forming and container filling apparatus including means for extruding paste downwardly through a die to form depending strands and further including cutting means cooperating with said die for cutting away said depending strands, the combination comprising a rotary trim knife spaced a predetermined variable distance below said die, means to rotate said trim knife to trim the leading ends of said depending strands, means for adjusting the height of said trim knife relative to said die, means for supporting a container below said die and laterally displaced from said trim knife for receiving said trimmed strands on being cut by said cutting means, a strand guiding chute positioned below said die and above both said trim knife and said container and movably mounted for guiding said depending strands, means for positioning said chute to guide said depending strands first to said trim knife and then directly over said container, and a filling chute positioned below said strand guiding chute and above said container and movably mounted to move with said trim knife height-adjusting means for guiding said depending strands into said container upon being cut by said cutting means whereby said strands are first trimmed to the desired length, then guided over said container and then cut by said cutting means to fall through both said guiding chute and said filling chute into said container.

10. In an alimentary paste products forming and container filling apparatus including means for extruding paste downwardly through a die to form depending strands and further including cutting means cooperating with said die for cutting away said depending strands, the combination comprising a rotary trim knife spaced a predetermined variable distance below said die, means to rotate said trim knife to trim the leading ends of said depending strands, means for adjusting the height of said trim knife relative to said die, means for supporting a container below said die and laterally displaced from said trim knife for receiving said trimmed strands on being cut by said cutting means, a strand guiding chute positioned below said die and above both said trim knife and said container and movably mounted for guiding said depending strands, means for positioning said chute to guide said depending strands first to said trim knife and then directly over said container, an upper filling chute positioned below said strand guiding chute and above said container and movably mounted to move with said trim knife height-adjusting means for guiding said depending strands into said container upon being cut by said cutting means, and a lower filling chute positioned above said container and below said upper filling chute, the inlet of said lower filling chute being sized to fit around the outlet of said upper filling chute for guiding said depending strands into said container upon being cut by said cutting means, whereby said depending strands on being cut by said cutting means fall first through said upper filling chute and then through said lower filling chute into said container.

11. In apparatus for forming alimentary paste products and filling containers therewith, including means for extruding paste downwardly through a die from which paste strands depend and further including cutting means cooperating with said die for cutting away said depending strands, the combination comprising trimming means spaced a predetermined distance below said die to trim the leading ends of said depending strands to equal lengths, means for supporting a strand-receiving container below said die and laterally displaced from said die and trimming means, a strand guide chute positioned below said die and above both said trimming means and said container and movable to a first position to guide said depending strands to said trimming means and to a second position to guide said strands to said container, means for positioning said chute to guide said strands first to said trimming means and then directly over said container, whereby said strands are first trimmed and then guided over said container preparatory for said cutting operation, and control means for then actuating said cutting means to cut said strands comprising a timer element and counter element connected to actuate the cutting operation only when sufficient time has elapsed for all of said depending strands to become full grown down to said trimming means and when said container is in position ready to receive said cut strands.

12. In apparatus for forming alimentary paste products and filling containers therewith, including means for extruding paste downwardly through a die from which paste strands depend and further including cutting means cooperating with said die for cutting away said depending strands, the combination comprising trimming means spaced a predetermined distance below said die to trim the leading ends of said depending strands to equal lengths, means for supporting a strand-receiving container below said die and laterally displaced from said die and trimming means, a strand guide chute positioned below said die and above both said trimming means and said container and movable to a first position to guide said depending strands to said trimming means and to a second position to guide said strands to said container, means for positioning said chute to guide said strands first to said trimming means and then directly over said container, whereby said strands are first trimmed and then guided over said container preparatory for said cutting operation, and control means for then actuating said cutting means to cut said strands only when sufficient time has elapsed for all of said depending strands to become full grown down to said trimming means and when said container is in position ready to receive said cut strands.

13. In apparatus for forming alimentary paste products and filling containers therewith including means for extruding paste downwardly through a die from which paste strands depend and further including cutting means cooperating with said die for cutting away said depending strands, the combination comprising a rotary trim knife spaced a predetermined variable distance below said die, means for continuously rotating said trim knife to trim the leading ends of said depending strands, means for adjusting the distance between said die and said rotary trim knife, means for supporting a strand-receiving container below said die and laterally displaced from said trim knife, a strand-guiding chute positioned below said die and above both said trim knife and said container, means swingably mounting said chute to permit positioning at a first position where it is adapted to guide said depending strands to said trim knife and to a second position where it is adapted to guide said strands to said container, and means for alternately swinging said guiding chute to said first and second position; and control means for actuating said cutter means comprising a preset timer element and container counter element interconnected to permit actuation of said cutting means only when sufficient time has elapsed for all of said depending strands to be full-grown down to said trim knife and when said counter element senses the presence of an empty container ready to be filled.

14. Apparatus for forming alimentary paste products and filling cans therewith including means for extruding paste downwardly through a die from which paste strands depend and further including trimming and cutting means cooperating with said die for cutting away predetermined lengths of said depending strands and further including a can-conveyor and positioning means for successively positioning empty cans in position for receiving said cut strands, control means for actuating said cutting means comprising means for sensing the positioning of each of said cans by said can positioning means, means for timing the operation of said positioning means, and means for actuating said cutting means controlled by both said can position sensing means and said timing means to actuate said cutting means whereby said cutting means is actuated only when said can position sensing means indicates proper positioning of said cans for receiving said cut strands and when said timing means indicates sufficient time lapse for even trimming of said strands to produce said predetermined lengths when cut off by said cutting means.

15. In apparatus for forming alimentary paste products and filling cans therewith including means for extruding paste downwardly through a die from which paste strands depend and further including trimming and cutting means cooperating with said die for cutting away predetermined lengths of said depending strands, the combination comprising a power-actuated rotary trim knife spaced a predetermined distance directly below said die to trim the leading ends of said depending strands; means for positioning a can below said die and offset from said trim knife; a strand guide positioned below said die and above said trim knife and adapted to gather and direct said depending strands from said die to said trim knife and can, said guide being pivoted beneath said die to permit swinging from a position over said trim knife to a position over said can; a push-bar pivotally attached to the lower end of said strand guide to swing said guide alternately between said positions; and means to actuate said push-bar in synchronism with said operation of said cutting means comprising a power-actuated strand guide cam shaft, a strand-guide-positioning cam and a cam follower means linking said cam shaft to said push-bar, a clutch-tripping lever attached to said cam shaft, and a one-revolution clutch means for supplying power to said cutting means, said clutch means being actuated by said clutch-tripping lever whereby said strands are first trimmed, then guided over said can and then cut by said cutting means to fall freely into said can.

16. In apparatus for forming alimentary paste products and filling cans therewith including means for extruding paste downwardly through a die from which paste strands depend and further including trimming and cutting means cooperating with said die for cutting away predetermined lengths of said depending strands, the combination comprising trimming means adjustable in height from said die comprising, a rotary trim knife positioned a predetermined distance directly below said die, means for driving said knife to trim the leading ends of said depending strands, and an adjustable mounting comprising fixed threaded collar means, lifter screw means threaded through said collar means, a mounting plate positioned by said lifter means, and provided with bearing brackets for supporting both said trim knife and said knife-driving means and means for turning said lifter screw means to adjust the height of said mounting relative to said die whereby the trimmed length of said depending strands can be varied; means for positioning a can below said die and offset from said trim knife; a strand guide positioned below said die and above said trim knife and adapted to gather and direct said depending strands from said die to said trim knife and can, said guide being pivoted beneath said die to permit swinging from a position over said trim knife to a position over said can; a push-bar pivotally attached to the lower end of said strand guide to swing said guide alternately between said positions; and means to actuate said push-bar in synchronism with said operation of said cutting means comprising a power-actuated strand guide cam shaft, a strand-guide-positioning cam and a cam follower means linking said cam shaft to said push-bar, a clutch-tripping lever attached to said cam shaft, and a one-revolution clutch means for supplying power to said cutting means, said clutch means being actuated by said clutch-tripping lever whereby said strands are first cutting means, said clutch means beinga ctuated by said cutting means to fall freely into said can.

17. Spaghetti forming, cutting and loading apparatus comprising in combination:
   (a) a spaghetti extruder to continuously extrude downwardly depending strands of spaghetti,
   (b) trimming means positioned below said extruder to trim the leading ends of the sphaghetti,
   (c) means for positioning a container below and laterally displaced from said trimming means to receive the spaghetti separately from trimming cut by said trimming means,
   (d) movable strand guide means between said extruder and said trimming means to guide the leading ends of spaghetti first to said trimming means and then to said container,
   (e) a cut-off knife below said extruder and spaced above said trimming means to cut the spaghetti to the desired length, and
   (f) means for moving said strand guide means to direct the spaghetti away from said trimming means and into said container upon being cut by said cutting means.

18. Apparatus as claimed in claim 17 wherein said trimming means comprises a trimmer means to repetitively trim substantially uniform small lengths of spaghetti from the leading ends of spaghetti depending from said extruder.

19. Apparatus as claimed in claim 17 wherein said trimming means comprises a continuously rotating trimmer positioned to repetitively trim substantially uniform small lengths of spaghetti from the leading ends of spaghetti depending from said extruder.

20. Spaghetti forming, cutting and loading apparatus comprising in combination:
   (a) a spaghetti extruder to continuously extrude downwardly depending strands of spaghetti,
   (b) trimming means movably positioned below said extruder to trim the leading ends of the spaghetti,
   (c) means for positioning a container below and laterally displaced from said trimming means to receive the spaghetti separately from trimmings cut by said trimming means,
   (d) movable strand guide means between said extruder and said trimming means to guide the leading ends of spaghetti first to said trimming means and then to said container,
   (e) a cut-off knife below said extruder and spaced above said movably positioned trimming means to cut said spaghetti to the desired length,
   (f) means to vary the position of said trimming means relative to said cut-off knife, and
   (g) means for moving said strand guide means to direct the spaghetti away from said trimming means and into said container upon being cut by said cutting means.

21. Apparatus as claimed in claim 20 wherein said trimming means comprises a continuously rotating trimmer movably positioned below said extruder to repetitively trim substantially uniform small lengths of spaghetti from the leading ends of spaghetti depending from said extruder.

22. Apparatus as claimed in claim 17 wherein said strand guide comprises chute means having an upper end adjacent said extruder and a lower end adjacent said trimming means through which the spaghetti passes, and means for pivotally supporting said chute means to permit swinging said lower end between said trimming means and said container while keeping said upper end adjacent said extruder.

23. Apparatus as claimed in claim 22 wherein said means for moving said strand guide comprises means for moving said lower end between said trimming means and said container while keeping said upper end adjacent said extruder to direct the spaghetti into said container upon being cut by said cutting means.

24. Apparatus as claimed in claim 17 further comprising means responsive to the movement of said strand guide means to actuate said cut-off knife in synchronism with the movement of said strand guide means to cut said spaghetti when said strand guide means is positioned to guide the cut spaghetti into said container.

25. Spaghetti forming, cutting and loading apparatus comprising in combination:
(a) a spaghetti extruder to continuously extrude downwardly depending strands of spaghetti,
(b) trimming means positioned below said extruder to trim the leading ends of the spaghetti,
(c) means for positioning a container below and laterally displaced from said trimming means,
(d) movable strand guide means between said extruder and said trimming means to guide the leading ends of spaghetti to said trimming means, said strand guide comprising chute means having an upper end adjacent said extruder and a lower end adjacent said trimming means and into said container upon being said chute means to permit swinging said lower end to direct the spaghetti away from said trimming means toward said container,
(e) a cut-off knife positioned below said extruder and spaced above said trimming means to cut the spaghetti to the desired length,
(f) means for moving said lower end of said strand guide means to direct said spaghetti away from said trimming means an into said container upon being cut by said cut-off knife, and
(g) means responsive to the movement of said strand guide means to actuate said cut-off knife in synchronism with the movement of said strand guide means to cut said spaghetti when said strand guide is positioned to guide the cut spaghetti into said container.

26. Apparatus as claimed in claim 25 wherein said trimming means comprises a continuously rotating trimmer positioned to repetitively trim substantially uniform small lengths of spaghetti from the leading ends of said spaghetti depending from said extruder.

27. A spaghetti forming, cutting and loading apparatus comprising in combination:
(a) container positioning means to position said container for receipt of said spaghetti from said machine,
(b) timer means to determine the duration of the spaghetti forming operation of said machine,
(c) cutting means for cutting the spaghetti to the desired length, and
(d) means for actuating said cutting means, said actuating means being controlled by both said container positioning means and said timer means to cause cutting of the spaghetti only when a container is positioned for receipt of said spaghetti and when said timer means determines that sufficient spaghetti forming time has passed to obtain cut strands of the desired length.

28. The method of controlling spaghetti forming, cutting and loading apparatus comprising in combination the steps of:
(a) continuously extruding downwardly depending strands of spaghetti at a steady rate of extrusion;
(b) cutting the strands of spaghetti to the desired length;
(c) positioning a container for receipt of the cut spaghetti;
(d) sensing the passage of the time period required for extruding the desired length of spaghetti at said rate, said sensing being commenced simultaneously with said extruding, and
(e) actuating the cutting of the spaghetti in response to the completion of both said container positioning and sensing steps.

29. The method of forming, cutting and loading spaghetti into a container comprising in combination the steps of:
(a) continuously extruding spaghetti in downwardly depending strands,
(b) repetitively trimming the leading ends of the strands to uniform length by cutting away small lengths of spaghetti,
(c) positioning said container in a position for receiving the trimmed strands separately from the trimmings caused by said trimming,
(d) guiding the trimmed strands away from the trimming position toward said container, and
(e) cutting the trimmed strands to the desired length after such strands are guided away from their trimming position, whereby the spaghetti upon being trimmed and cut falls into said container.

References Cited by the Examiner

UNITED STATES PATENTS

| | | | |
|---|---|---|---|
| 2,687,101 | 8/1954 | De Francisci | 107—7.8 |
| 2,977,902 | 4/1961 | Johannes | 107—69 |

WALTER A. SCHEEL, *Primary Examiner.*

J. SHEA, *Examiner.*

UNITED STATES PATENT OFFICE
CERTIFICATE OF CORRECTION

Patent No. 3,315,620                                    April 25, 1967

Ignatius Bontempi

It is hereby certified that error appears in the above numbered patent requiring correction and that the said Letters Patent should read as corrected below.

Column 3, line 48, for "describtd" read -- described --; column 4, line 57, for "trimemr" read -- trimmer --; column 9, line 16, for "as" read -- a --; column 11, line 16, for "end" read -- ends --; column 16, line 18, strike out "cutting means, said clutch means beinga ctuated by said" and insert instead -- trimmed, then guided over said can and then cut by said --; column 17, line 38, strike out "and into said container upon being" and insert instead -- and means for pivotally supporting --.

Signed and sealed this 21st day of November 1967.

(SEAL)
Attest:

EDWARD M. FLETCHER, JR.                      EDWARD J. BRENNER
Attesting Officer                              Commissioner of Patents